Aug. 16, 1938. H. J. FINDLEY 2,127,166
ELECTRIC MOTOR
Filed May 28, 1936
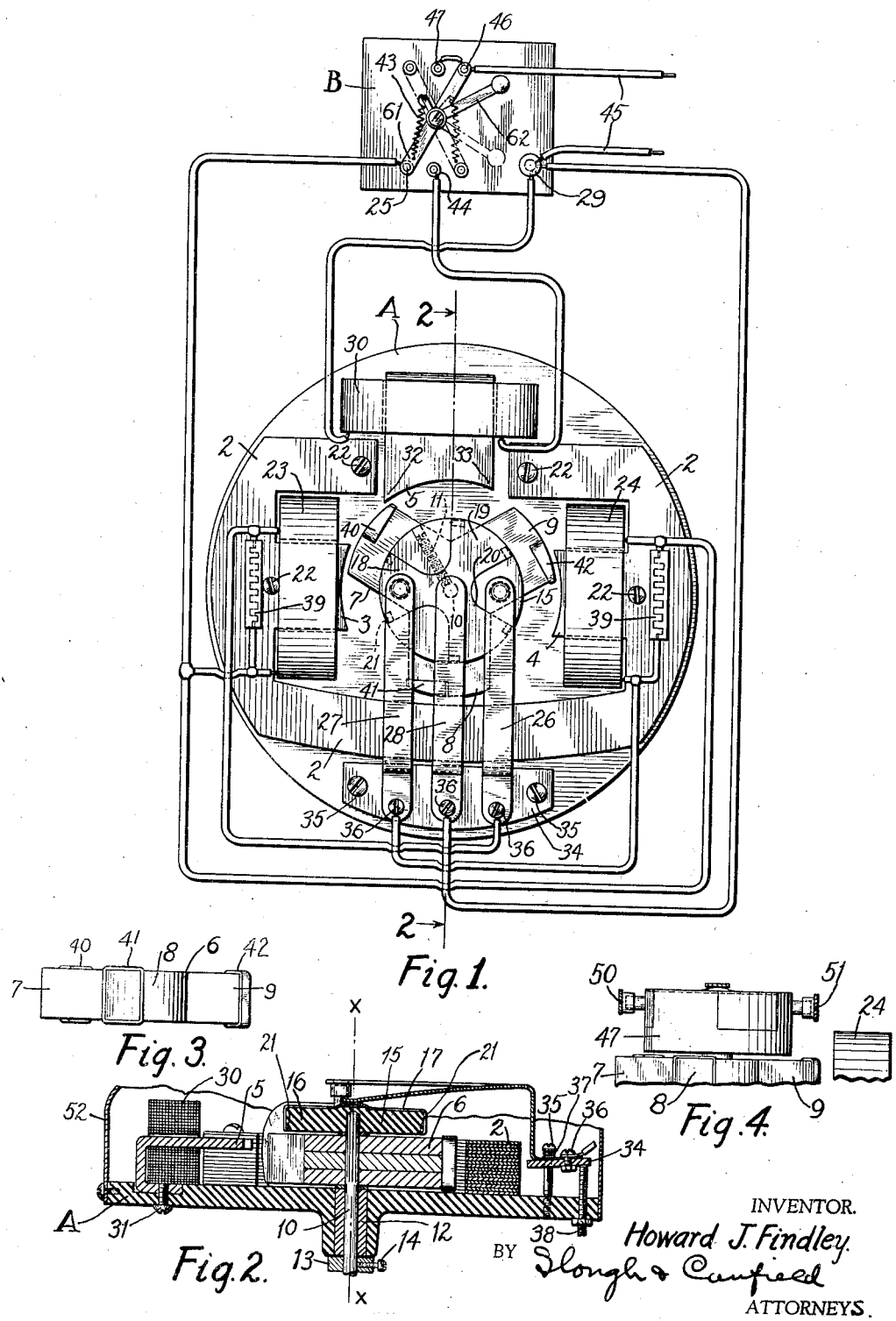
INVENTOR.
Howard J. Findley.
BY Slough & Canfield
ATTORNEYS.

Patented Aug. 16, 1938

2,127,166

UNITED STATES PATENT OFFICE 2,127,166

ELECTRIC MOTOR

Howard J. Findley, Cleveland, Ohio, assignor to The Bishop & Babcock Mfg. Company, Cleveland, Ohio, a corporation of Ohio Application May 28, 1936, Serial No. 82,220

4 Claims. (Cl. 172—36)

My invention relates to electric motors. More particularly my invention relates to direct current electric motors of an accentuated flat type and is especially adapted for use to operate air blowing apparatus electric heaters, and equipment for the passenger compartment of automotive vehicles.

Direct current electric motors otherwise suitable to communicate rotary motion to air blowing apparatus are commonly so constructed as to be of considerable axial extent and therefore when a fan or air blower impeller is affixed to an end of the motor shaft the entire apparatus becomes excessively deep in the direction of said shaft, and also such prior structures are of considerable weight and expensive to manufacture.

It is very desirable, particularly in the case of motors for air blowing apparatus of the type adapted to be affixed to the wall or windshield of an automotive vehicle in order to blow air over the surface of the windshield to remove moisture therefrom either in the form of condensed vapors, or frost, that the entire apparatus be restrained within very limited dimensions axially of the motor shaft. Electric motors now commonly in use are necessarily of considerable axial extent largely because of the presence of a wound armature and together with the usual commutator carried axially of the armature windings and end bearings on each end of the shaft, the whole being suitably enclosed in a more or less tubular casing.

I am aware that direct current electric motors of the so-called impulse type employing an iron armature without winding, have been proposed largely for use to operate children's toys, but these are not sufficiently flat, or are subject to difficulties in operation affecting the reliability for other purposes than toys, such as the defect inherent in all or most of these, that after being operated and the electric current then interrupted to stop the motor, the re-application of the current often is ineffective to re-start the motor because of the fact that the armature or rotor had assumed such a rotative position relative to the stator field coils, as to be magnetically balanced for both directions of rotation, and in some cases are in such a rotative position as to open the circuit of the electric current at the commutator so that the field coils cannot be energized at all. Commonly also such electric motors are ineffective to operate under conditions of considerable torque, i. e., when a heavy load is applied to the motor, rotation of the rotor will be discontinued and the rotor will assume the aforesaid rotative position of magnetic balance, or wherein the circuit is opened.

An object of my invention therefore is to provide an electric motor operable by direct current which may be operated with considerable efficiency as compared to similar motors of the same weight of the wound armature type, but which may be made in a very flattened form, i. e., so that it will not extend axially of the motor shaft to as great an extent as prior motors of the same power which otherwise would be applicable to the same service.

Another object of my invention is to provide an improved direct current impulse type motor, with suitable starting appurtenances that when the starting switch is thrown to cause electric current to traverse the motor windings, the rotor and stator poles will always correctly assume a non-balanced relative rotative position so that the starting current will invariably cause rotation of the rotor.

Another object of my invention is to provide an improved rotor pre-setting mechanism for insuring ready starting of the motor.

Another object of my invention is to provide an improved motor of the self-starting direct current impulse type.

Another object of my invention is to provide an improved efficient inexpensive direct current motor of the so-called pan-cake flattened type.

Another object of my invention is to achieve operation of a motor of the type to which my invention relates, without destructive arcing which would result in deterioration of the commutating controlling contacts.

Another object of my invention is to provide an improved starting apparatus for electric motors of the general type to which my invention relates.

Other objects of my invention and the invention itself will be apparent to those skilled in the art.

I find that motors of the class to which my invention relates operate more satisfactorily if the pole pieces of the rotor element are provided with shading coils, and it is another object of my invention to provide the motor pole pieces with such shading coils in order to insure more satisfactory operation as, for example, a higher speed of rotation under torque conditions than would be obtained otherwise.

The nature of my invention as well as its other objects will appear more in detail in the following specification including the accompanying drawing, in which latter I have illustrated an embodiment of my invention and certain modifications or variations thereof. It will be understood, however, that I do not limit my invention to the construction shown in the drawing inasmuch as said invention contemplates all such modifications or variations as may come or fall within the spirit of my invention or within the scope of the claims contained herein.

Referring to said drawing Fig. 1 is a plan view of one form of motor of my invention with its related circuits and switch devices shown diagrammatically. In this figure the motor cover is not shown.

Fig. 2 is a view of the motor per se in side elevation and in section taken on line 2—2 Fig. 1. In this figure a cover is partially shown.

Fig. 3 is an end view in elevation, of the rotor of the motor of Figs. 1 and 2 showing the three pole pieces which are of special construction.

Fig. 4 is a view in elevation showing a modification of the motor commutator mechanism, which commutator, as also the one shown in Figs. 1 and 2 is mounted on the rotor.

Referring to Figs. 1 and 2 of the drawing, the motor is mounted on a base or frame A and in the particular form shown, it is provided with three pole pieces, 3, 4 and 5 projecting inwardly, that is, toward the central longitudinal axis $x$—$x$ of the motor, see Fig. 2. Two of these, 3 and 4 are field pole pieces and the third one, 5, is a rotor presetting pole piece.

The motor is also provided with a rotor element 6 having three pole pieces 7, 8 and 9. Said rotor is secured to the shaft 10 in any suitable manner but preferably by tightly driven thereon over the fluted end of the shaft. This rotor is also laminated as indicated, although if a less expensive construction is desired the laminations may be omitted. The shaft is set in a journal 12, which latter is centrally located in the base A. The shaft is held in place by a suitable collar 13 which latter, in turn, is held in place by a set-screw 14. On said shaft a bushing is provided between the rotor and its journal as shown in Fig. 2, in order to insure a suitable clearance between the rotor and the base A. To the upper end of the shaft 10, Fig. 2 there is secured in any suitable manner, as for example by means of a set screw 11, a commutator element 15, which is driven by the shaft to rotate therewith. The said commutator comprises a disc 16 of insulating material such as hard rubber or Bakelite. On this disc there is mounted a metallic commutator element 17, having preferably three diverging branches or segments formed and arranged preferably as shown: 18, 19 and 20. As indicated in Figs. 1 and 2 a pair of fingers 21, which are formed on the end of each of the said branches, are folded over the periphery of the disc 16 to hold the metallic commutator element 17 in place. A suitable bushing is provided between the commutator element 17 from the rotor body.

Two of the pole pieces mentioned, namely, 3 and 4, are laminated and join a common yoke or body 2 which in general is C-shaped and which is also laminated as shown in Fig. 1 and which is laid on its side and secured to the base A by suitable means such as the screws 22. Each of the pole pieces 3 and 4 has a field coil 23 and 24 respectively, each of which has one end connected to a common circuit terminal 25 in a switch device B and each of which has its opposite end connected to a corresponding individual commutator brush 26 and 27 respectively. There is provided a third commutator brush 28 which maintains permanent contact with the metal commutator element 17 and which is connected in circuit with a terminal 29 in the switch B.

The pole piece 5 is provided with an energizing coil 30. The core of this coil, which terminates in said pole piece, is L-shaped, as shown in Fig. 2 and is also secured to the base A by suitable means such as the screw 31. The pole piece 5 of the coil 30 is located between the terminals of the C-shaped core of the coils 23 and 24, as shown in Fig. 1. Preferably one of the lips of the pole piece 5 has a leading tip 32, the left tip, which stands closer to the path of the rotor than the opposite tip 33. The latter stands further away from the path of the rotor, just about in the relation indicated in Fig. 1. The brushes 26, 27 and 28 of the commutator are suitably attached to a plate 34 of insulating material by means of screws 36. This plate is held in place by means of screws 35, each screw having a coiled spring 37 interposed between the plate and the head of the screw, whereby the plate may be tilted to adjust the tension of the brushes with respect to the commutator. This adjustment is carried out by means of an adjustable screw 38. In order to reduce, or prevent sparking at the commutator brushes, I provide each of the field coils 23 and 24 with a non-inductive shunt coil 39, which may be located at any suitable point.

Each of the pole pieces 7, 8 and 9 of the rotor is bifurcated and one prong of each pole is provided with a copper shading band 40, 41 and 42 respectively. These bands insure a better operation of the rotor, and are conducive to higher speeds in the rotation of the rotor when under torque load. These bands are preferably in the lead as the armature rotates.

For controlling the operation of the motor, I provide a toggle switch, namely the switch B. This switch has two stop positions. One of these positions is indicated by the solid lines of the switch arm 61 and the other by the dotted lines. This arm is operated by means of a lever 62. To change the position of the switch from solid to dotted position, the lever 62 is advanced toward the dotted position, but after the spring 43 passes the mid position the spring 43 completes the switching as is well understood. In order to reverse the switch, the position of the lever is reversed and the spring 43 automatically completes the operation after its mid position is passed. In passing from the dotted to solid position, the arm 61 makes a passing contact with the contact 44 for the purpose of preliminarily energizing the coil 30 to move the rotor to an initial starting position in which one of the outer brushes makes full contact with one of the commutator segments 18, 19 or 20 and thereby insure the operation of the rotor when the switch arm 61 reaches the solid position.

In Fig. 1 a pair of leads 45 is shown leading to a source of power, such as a battery or generator. One of these leads is connected to terminal 29 of the switch B and the other to the terminals 46 and 47.

The operation of the motor is as follows:
The lever 62 is moved by hand from the dotted position toward the full position. As the lever advances the spring 43 is stretched and by the time the lever reaches the midway position between the dotted and solid lines position, the spring reaches a position over the axis of rotation of the arm 61. The spring from this position on begins to retract and carries arm 61 automatically on toward the solid line position. In so doing the spring causes arm 61 to make a momentary or passing contact with contact 44 thereby closing an energizing circuit through the presetting coil 30. The circuit through the coil 30 extends from one side of line 45 through coil 30 to contact 44, thence over arm 61 to contact 47 and thence to the opposite side of line 45.

The coil 30 thereupon energizes and attracts one of the rotor pole pieces, pole piece 7, for example, moving it to a position opposite the pre-setting pole piece 5. The motion of the rotor causes the rotation of the commutator to a corresponding position, thereby suitably bringing the segment 19 under the brush 26, so that by the time the arm 61 reaches the contact 25 in the switch B, the circuit and rotor setting is ready for such energization of the field coil 23 which will initiate rotation of the rotor. The current will first flow over the following path: from one of the leads 45 to terminal 29 to brush 28, thence via the commutator segment 19, brush 26, coil 23, contact 25 at switch B, arm 61 to terminal contact 46 and to the opposite side of line 45. The coil 23 thereupon pulls rotor pole 8 around in a clockwise direction until segment 19 leaves brush 26 thus interrupting the current through coil 23. But by that time the segment 20 has made contact with brush 27. As a result the coil 24 now acts upon pole 7 of the rotor until the segment 20 advances from under the brush 27 and segment 18 passes under brush 26 thereby substituting the action of coil 23 for that of 24 and so on. The motor will then thus continue to function with the rotor rotating and commutator and alternate brushes functioning as long as the switch B is left in the solid or closed position. To stop the motor, the switch lever 62 is thrown to the dotted position thereby carrying the arm 61 to the open circuit position whereupon the motor will come to a stop.

If we assume that the rotor will stop on an open circuit position for both of the coils 23 and 24, as for example due to some oxidation, dust, grease or the like or stops at such a position that two adjacent rotor poles are left in a relatively counter-balanced position; that is, in opposed magnetically balanced rotative position with respect to the energized coil, then the fact that the switch lever 62, when reversed to start the motor will, as it advances, make a passing engagement with the contact 44 and energize the coil 30, will insure the rotor, and therefore the commutator, being advanced to clear the open or defective contact at the commutator and also avoid the magnetically balanced position of the rotor poles to insure the motor starting when the switch arm 61 reaches the solid line position.

In Fig. 4 I have indicated a modification in which the commutator insulation disc 47, corresponding to disc 16 of Fig. 2, is made higher and the segments of the commutator are folded over the side to place the commutator segments along the periphery of the disc where the brushes which are turned on their sides to engage the periphery of the commutator as indicated in Fig. 4 will now engage their segments. In this figure only two of the segments are shown, the third one being on the opposite side. The brushes 50 and 51 shown correspond to brushes 27 and 26. The rotor is the same and the pole pieces 7, 8 and 9 are the same as in Fig. 1.

In Fig. 2, I have indicated a cover 52 for the motor. This cover is secured to the base A in any suitable manner, as for example, by means of screws as indicated. Also on the lower end of the shaft 10, below the washer 13, a fan may be secured thereto in order to adapt the motor to be used as a windshield defroster or as a fan for a heater or the like.

It will be seen that I provide in a compact motor of very short field and rotor axial dimension, a most desirable feature which overcomes the possibility of the motor failing to start due to the brushes stopping in an open circuit when the rotor comes to a stop after the power is cut off or due to the rotor stopping in a neutral magnetic position.

In the latter case the presetting coil acts as an auxiliary to the stator in that it will deliver the rotor to the operative control of the stator by removing the rotor from its neutral magnetic position. As for example, should the rotor stop in a position with two of its poles equidistant from one of the field pole pieces 3 or 4, the balance of pull may be such that the rotor would not be able to advance in either direction. Under such conditions when the presetting coil 30 is energized the rotor is advanced to one of its pre-set positions (there being three possible ones, since the rotor has three poles) and delivered to the active rotative control of the stator.

It will be seen also that one of the features that contributes to the compactness of the motor is the absence of bearings on the commutator side of the shaft 10. This frees the shaft from anything above the commutator, contributes to low cost of manufacture and to lightness in structure. This last is of considerable importance where the motor is to be supported from one end, and especially so when the motor is to be installed in a vehicle subject to rough driving and jolting.

Also by the provision of shading coils, one on each prong of the bifurcated pole pieces of the rotor, I obtain in a compact motor of the character shown a higher speed than heretofore under torque conditions.

What I claim is:

1. In an electric motor, a rotor, a stator, a commutator mounted on said rotor to rotate therewith, brushes for said commutator and a circuit for energizing said stator, said rotor being under the control of said stator and said circuit being under the control of said commutator and said brushes whereby said rotor may be rotated as long as a source of potential is maintained applied to said circuit, auxiliary electro-magnetic means, said rotor being under the control of said auxiliary electro-magnetic means while said stator is de-energized whereby said circuit for energizing said stator may be controlled by said auxiliary electro-magnetic means through the medium of said rotor, said commutator and said brushes.

2. In an electric motor, a field winding, a rotor controlled by said winding, a commutator for said winding and brushes for said commutator, said winding, commutator and brushes being connected, when said rotor is in a given position, in a circuit over which the said field winding will become energized and the said rotor operated whenever a source of current is applied to said circuit, and electro-magnetic means for moving said rotor to said given position to insure the establishment of said circuit, and the operation of said rotor.

3. In an electric motor, a pair of pole pieces, an electric circuit containing means including a field coil on each of said pole pieces, a rotor element located between and being under the control of said pole pieces and coils, a commutator and brushes therefor, said commutator being mounted to be rotated by said rotor, whereby when a source of current is applied to said circuit, a flow of energizing current is set up and said rotor caused to operate and when said rotor is operated said flow of current is set up first through one and then through the other of said coils in alternate order and broken in alternate order, a switch in said circuit for opening and closing said circuit, and electro-magnetic means under the control of said switch for moving said rotor and commutator to a position to insure the establishment of a flow of current through one of said coils when said switch reaches its closed position.

4. In an electric motor, a rotor, a stator and a commutator device carried by said rotor to rotate therewith, brushes for said commutator, said rotor, stator, brushes and commutator being connected in operative relation to electric terminals whereby when a source of current is applied to said terminals said rotor is set in operation, and an electro-magnet in operative relation to said rotor, a circuit independent of said commutator and brushes over which circuit said electro-magnet may be energized, and terminals for said circuit last mentioned, whereby when a source of current is momentarily applied to said terminals last mentioned said electro-magnet is energized and said rotor is caused to move to a given position to place the said stator, commutator, brushes and terminals in operative relation, whereby when a source of current is applied to said terminals last mentioned the rotor will be operated by said stator.

HOWARD J. FINDLEY.